United States Patent
Schneider

[15] 3,683,038
[45] Aug. 8, 1972

[54] 5-VINYLBICYLO (2.2.1)HEPT-2-ENE ISOMERIZATION

[72] Inventor: Wolfgang Schneider, Brecksville, Ohio

[73] Assignee: The B. F. Goodrich Company, New York, N.Y.

[22] Filed: June 14, 1971

[21] Appl. No.: 153,095

[52] U.S. Cl. .................................260/666 PY
[51] Int. Cl. ..................................C07c 5/28
[58] Field of Search........................260/666 PY

[56] References Cited

UNITED STATES PATENTS

| | | | |
|---|---|---|---|
| 3,151,173 | 9/1964 | Nyce | 260/666 PY |
| 3,347,944 | 10/1967 | Fritz et al. | 260/666 PY |
| 3,535,395 | 10/1970 | Schneider | 260/666 PY |
| 3,535,396 | 10/1970 | Schneider | 260/666 PY |
| 3,538,171 | 11/1970 | Schneider | 260/666 PY |
| 3,565,961 | 2/1971 | Nagase et al. | 260/666 PY |
| 3,594,433 | 7/1971 | Schneider | 260/666 PY |

*Primary Examiner*—Delbert E. Gantz
*Assistant Examiner*—Veronica O'Keefe
*Attorney*—J. Hughes Powell, Jr. et al.

[57] ABSTRACT

5-Vinylbicyclo[2.2.1]hept-2-enes heated in the presence of a titanium catalyst system are isomerized to 5-ethyli-denebicyclo[2.2.1]hept-2-enes. The catalyst system of this invention comprises a titanium compound, an alkali metal, an aluminum halide and sodium cyclopentadiene. The catalyst system is highly efficient and capable of rapidly isomerizing 5-vinyl-bicyclo[2.2.1]hept-2-enes. 5-Ethylidenebicyclo[2.2.1]hept-2-enes are useful comonomers for polymerization with α-olefins such as ethylene and propylene.

6 Claims, No Drawings

5-VINYLBICYLO (2.2.1)HEPT-2-ENE ISOMERIZATION

BACKGROUND OF THE INVENTION

Previously known catalysts for the isomerization of 5-vinylbicyclo[2.2.1]hept-2-ene to 5-ethylidenebicyclo[2.2.1]hept-2-ene have not been completely satisfactory. Large amounts of catalyst are often necessary to achieve acceptable rates of isomerization. Significant amounts of by-products and poor catalyst efficiency were often noted.

SUMMARY OF THE INVENTION

I have now found quite unexpectedly an improved catalystic process for the isomerization of 5-vinylbicyclo[2.2.1]hept-2-enes to 5-ethylidenebicylco[2.2.1]hept-2-enes wherein high catalyst efficiencies are achieved. Rapid isomerization rates are realized with the process of the present invention. The increased rate of isomerization and excellent catalyst efficiencies obtained with the present catalysts are significant since it is now possible to achieve isomerization in very short periods of time employing very low catalyst concentrations. In this manner by-products formed during the isomerization are minimized and in most instances completely eliminated. The present process utilizes a titanium catalyst comprising a titanium tetravalent compound, an alkali metal, an aluminum halide and sodium cyclopentadiene.

DETAILED DESCRIPTION

The isomerization reaction of this invention may be represented as follows:

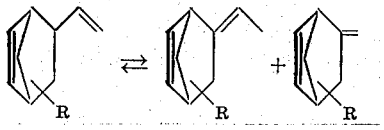

wherein R is a hydrogen or alkyl group concerning from one to four carbon atoms. The process is particularly useful to obtain 5-ethylidenebicyclo[2.2.1]hept-2-ene (R = H) which is a useful monomer for copolymerization with olefins such as ethylene and propylene.

5-Vinylbicyclo[2.2.1]hept-2-enes employed in the present isomerization process correspond to the structural formula

wherein R is a hydrogen or an alkyl group containing from one to four carbon atoms. The present process is particularly advantageous for the isomerization of 5-vinylbicyclo[2.2.1]hept-2-ene (where R = H) since this material is readily available from the Diels-Alder addition of 1,3-cyclopentadiene and 1,3-butadiene. Other 5-vinylbicyclo[2.2.1]hept-2-enes, such as methyl-5-vinylbicyclo[2.2.1]hept-2-enes obtained from the reaction of 1,3-cyclopentadiene with piperylene or methyl 1,3-cyclopentadiene and butadiene, are just as effectively isomerized by the present process.

While any titanium compound may be used, the particular titanium compounds employed were titanium tetrahalides and titanium alcoholates which correspond to the structural formula

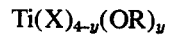

$$Ti(X)_{4-y}(OR)_y$$

wherein X is chlorine, bromine or iodine, R is a hydrocarbon radical containing from one to 12 carbon atoms and more preferably one to eight carbon atoms, such as alkyl, cycloalkyl, aryl and alkaryl groups, and y is an integer from 0 to 4. Excellent results are obtained with titanium tetrachloride, titanium tetrabromide, titanium tetraiodide, $C_2H_5OTiCl_3$, $(C_2H_5O)_2TiCl_2$, $(C_2H_5O)_3TiCl$, tetraethyl titanate, tetra-(isopropyl)titanate, tetra-n-butyl titanate, tetra-(2-ethylhexyl)titanate and tetraphenyl titanate. Mixtures of these titanium compounds may also be employed. For example, mixtures of titanium tetrahalides with tetraalkyl titanates are useful as the titanium component in forming the catalyst of the present process.

Any of the available alkali metals may be used in the process but sodium, because of availability and cost, is preferred. To be used most effectively, the sodium should be in finely divided or activated form as in the form of sodium sand, dispersions of sodium in inert solvents as mineral oil, or the isomerization reaction conducted at temperatures above 97.5° C., which is the melting point of sodium, liquid sodium being particularly effective. Activated sodium is well known in organic syntheses.

While any aluminum halide may be used, better results are obtained with aluminum chloride and aluminum bromide.

The present catalyst systems are obtained by contacting the titanium compound with the alkali metal, aluminum halide and sodium cyclopentadiene. The catalyst may be prepared prior to use or the individual catalyst components may be mixed in the reactor in the presence of the 5-vinylbicyclo[2.2.1]hept-2-ene. If the catalyst system is prepared prior to the isomerization the components are generally admixed in an inert solvent. This latter method facilitates subsequent storage, handling and charging of the catalyst and is a useful means to control the reaction exotherm.

While large amounts of the titanium compound may be employed, it is an advantage of this invention that small amounts in the range from about 100 millimols per mol 5-vinylbicyclo[2.2.1]hept-2-ene to about 0.1 millimol per mol 5-vinylbicyclo[2.2.1]hept-2-ene may be used. More of the titanium compounds per mol 5-vinylbicyclo[2.2.1]hept-2-ene can be employed if desired. Excellent results have been obtained when the concentration of the titanium compound is between about 50 millimols and 1 per mol 5-vinylbicyclo[2.2.1]hept-2-ene.

About 2 to 10 mol equivalents each of alkali metal and sodium cyclopentadiene may be used per mol equivalent of titanium compound. About 1 to 5 mol equivalents of aluminum halide per mol equivalent of titanium compound also may be used. Excellent results are obtained with about a 1:1 molar ratio of aluminum chloride to titanium compound and about 4:1 mols of sodium and sodium cyclopentadiene each, per mol of titanium. While a large molar excess of these three constituents may be used, there is no particular advantage in such excess.

The isomerization is carried out by reacting the 5-vinylbicyclo[2.2.1]hept-2-ene in the presence of the titanium catalyst system. The 5-vinylbicyclo[2.2.1]hept-2-ene is generally charged to the reactor and the pre-formed catalyst or the individual catalyst components added thereto. The catalyst or individual catalyst components may be completely charged at the outset of the isomerization or charged continuously as the isomerization progresses. The process may be conducted employing either batch or continuous techniques. Prior to the introduction of the pre-formed catalyst or the titanium compound if the catalyst is to be prepared in situ, an amount of organometallic compound may be charged to the reactor to remove small amounts of undesirable impurities present in the system. The 5-ethylidenebicyclo[2.2.1]hept-2-enes can be recovered by fractional distillation or it may be removed continuously throughout the run if continuous operation is employed.

While is is not necessary and bulk reactions are satisfactory, the isomerization may be conducted in an inert diluent such as the aromatic or saturated aliphatic hydrocarbons. Higher boiling saturated hydrocarbons may be employed since they do not interfere with the recovery of the 5-ethylidenebicyclo[2.2.1]hept-2-ene and also permit operation of the process within the desired temperature range without the use of pressure vessels. Useful hydrocarbon solvents include pentane, isopentane, 2,2-dimethylpentane, 2,4-dimethylpentane, 3,3-dimethylpentane, 3-ethylpentane, n-hexane, isohexane, 3-methylhexane n-heptane, n-octane, isooctane, cyclohexane, benzene, toluene, the xylenes, mesitylene and the like or mixtures thereof. If a diluent is employed the ratio of the diluent to 5-vinylbicyclo[2.2.1]hept-2-ene will generally range between about 1:10 and about 10:1.

It is not essential that the 5-vinylbicyclo[2.2.1]hept-2-ene be absolutely pure, however, the presence of large amounts of impurities should be avoided for best results. Small amounts of impurities such as water, alcohols, peroxides and air present in the 5-vinylbicyclo[2.2.1]hept-2-ene or diluent can be tolerated, however, it is preferred they be removed by the addition of a scavenging agent, which in this case can also serve as the modifier, or by some other suitable means. Distillation or sieving of the 5-vinylbicyclo[2.2.1]hept-2-ene and diluent prior to use will generally suffice to remove most impurities which seriously impair the catalyst efficiency or promote formation of polymeric materials. It is often advantageous to employ sufficient excess of the alkali metal so that it will also serve as a scavenger to remove impurities such as oxygen, alcohols, water and the like present in the system.

The isomerization process is typically conducted under a dry atmosphere of an inert gas such as nitrogen or argon and may be conducted at atmospheric, sub-atmospheric or superatmospheric pressure depending on the reaction conditions and diluent employed.

The isomerization process is typically conducted at temperatures above 25° C., up to 300° C. or above. Excellent results, i.e., high catalyst efficiency and a rapid isomerization have been obtained within the temperature range of about 40° to 200° C. The increased rate of isomerization achieved with the present invention permits the isomerization of 5-vinylbicyclo[2.2.1]hept-2-ene to 5-ethylidenebicyclo[2.2.1]hept-2-ene on a continuous basis. At room temperature the rate of isomerization, although considerably slower than obtained at elevated temperatures, is nevertheless significant and a reasonable degree of conversion can be achieved.

The invention is illustrated more fully as follows by a representative example that is not intended to limit the scope thereof.

0.1 Mol 5-vinylbicyclo[2.2.1]hept-2-ene prepared by the Diels-Alder reaction of 1,3-cyclopentadiene and 1,3-butadiene as described by A.F. Plate' and N.A. Belikova in ZHURNAL OBSHCHEI KHIMII, 30, No. 12, 3945–54 (1960) was charged to a dry argon-purged reactor containing an equivalent volume of mesitylene, 2 millimols of $AlCl_3$, 4 millimols of sodium, 1.25 millimols of $TiCl_4$ and 5 millimols of sodium cyclopentadiene were added at room temperature with stirring while maintaining the argon purge. The reactor and its contents were allowed to stand at room temperature for 4 days. The resulting reaction product analyzed by vapor phase chromatography was found to contain 98 percent 5-ethylidenebicyclo[2.2.1]hept-2-ene.

Copolymers of ethylene, propylene and 5-ethylidenebicyclo[2.2.1]hept-2-ene are readily prepared by methods known to those skilled in the art. Such elastomers are useful in the manufacture of tire carcasses and sidewalls.

I claim:

1. A process for the isomerization of 5-vinylbicyclo[2.2.1]hept-2-enes to 5-ethylidenebicyclo[2.2.1]hept-2-enes which comprises contacting a 5-vinylbicyclo[2.2.1]hept-2-ene of the formula

wherein R is a hydrogen or an alkyl group containing from one to four carbon atoms with a catalyst formed by mixing (1) a titanium compound of the formula

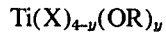

wherein X is chlorine, bromine or iodine, R is a hydrocarbon radical containing from one to 12 carbon atoms, and $y$ is an integer from 0 to 4, or mixture thereof, (2) an alkali metal, (3) an aluminum halide and (4) sodium cyclopentadiene.

2. The process of claim 1 wherein the isomerization is conducted at a temperature between about 25° C. and 300° C. with about 2 to 10 mol equivalents of (2) and (4), and about 1 to 5 mol equivalents of (3) per mol equivalent of (1).

3. The process of claim 2 wherein the 5-vinylbicyclo[2.2.1]hept-2-ene is 5-vinylbicyclo[2.2.1]hept-2-ene.

4. The process of claim 3 wherein (1) is $TiCl_4$, (2) is sodium and (3) is $AlCl_3$.

5. The process of claim 4 with about 20 millimols to 0.001 millimol of (1) per mol 5-vinylbicyclo[2.2.1]hept-2-ene and about 2.25 to 5 mol equivalents each of (2) and (4) and about 1 to 2.5 mol equivalents of (3) per mol equivalent of (8).

6. The process of claim 5 wherein about 5 millimols to 0.01 millimol (1) per mol 5-vinylbicyclo[2.2.1]hept-2-ene is employed.

* * * * *